(12) United States Patent
Witt et al.

(10) Patent No.: US 7,950,415 B2
(45) Date of Patent: May 31, 2011

(54) COUPLING FOR SELF-CONTAINED BREATHING APPARATUS

(75) Inventors: Stefan Witt, Eberdingen (DE); Horst Simon, Gummersbach (DE)

(73) Assignee: TEMA Marketing AG, Zug (CH)

( * ) Notice: Subject to any disclaimer, the term of this patent is extended or adjusted under 35 U.S.C. 154(b) by 828 days.

(21) Appl. No.: 11/791,874

(22) PCT Filed: Nov. 30, 2005

(86) PCT No.: PCT/EP2005/012751
§ 371 (c)(1),
(2), (4) Date: Sep. 11, 2007

(87) PCT Pub. No.: WO2006/058712
PCT Pub. Date: Jun. 8, 2006

(65) Prior Publication Data
US 2008/0135048 A1     Jun. 12, 2008

(30) Foreign Application Priority Data
Nov. 30, 2004  (DE) .......................... 10 2004 057 917

(51) Int. Cl.
*F16L 37/34* (2006.01)
(52) U.S. Cl. ........... 137/614.03; 137/614.06; 251/149.6; 251/149.9
(58) Field of Classification Search ............. 137/614.03, 137/614.06; 251/149.6, 149.9; 285/13, 14, 285/900, 924
See application file for complete search history.

(56) References Cited

U.S. PATENT DOCUMENTS

| 2,828,978 | A | * | 4/1958 | Wurzburger | 137/614.03 |
| 2,896,971 | A | | 7/1959 | Kolar | |
| 3,097,867 | A | * | 7/1963 | Saloum | 137/614.03 |
| 3,224,728 | A | * | 12/1965 | Buseth et al. | 251/149.6 |
| RE27,364 | E | * | 5/1972 | German | 251/149.6 |
| 4,086,939 | A | * | 5/1978 | Wilcox et al. | 137/614.03 |
| 4,219,048 | A | * | 8/1980 | Ekman | 137/614.03 |
| 4,289,164 | A | * | 9/1981 | Ekman | 137/614.03 |
| 4,447,040 | A | * | 5/1984 | Magorien | 137/614.03 |
| 5,855,227 | A | * | 1/1999 | Stucchi | 137/614.03 |
| 5,967,491 | A | * | 10/1999 | Magnuson et al. | 251/149.6 |
| 5,996,624 | A | * | 12/1999 | Ekman | 137/614.03 |
| 6,145,539 | A | * | 11/2000 | Wilcox et al. | 137/614.03 |

(Continued)

FOREIGN PATENT DOCUMENTS
DE           851876 C      10/1952

*Primary Examiner* — John Rivell
*Assistant Examiner* — Craig Price
(74) *Attorney, Agent, or Firm* — Leydig, Voit & Mayer, Ltd.

(57) ABSTRACT

A socket part actuated without pressure for a fluid coupling is provided with a mechanism for mechanically sealing, to a large extent, the insertion space of a plug against the penetration of foreign matter. In addition, a throttling device is provided, which practically does not obstruct the fluid connection for an inserted plug, while a high flow resistance is produced for a plug that has been pulled out, without, however, completely blocking the flow path. The associated plug also has a sealing device in order to protect the flow channel against the penetration of particles when the plug is removed. In case the plug is connected to a compressed-air tank, this is provided with a throttling device, which practically does not obstruct flow for an inserted plug, but forms considerable flow resistance for a removed plug without completely blocking the flow.

46 Claims, 5 Drawing Sheets

U.S. PATENT DOCUMENTS

| | | | | |
|---|---|---|---|---|
| 6,158,717 A | * | 12/2000 | Van Scyoc et al. | 251/149.6 |
| 6,382,251 B1 | * | 5/2002 | Hopson | 137/614.04 |
| 6,412,828 B1 | * | 7/2002 | Lacroix et al. | 285/900 |
| 6,557,824 B1 | * | 5/2003 | Jenski et al. | 251/149.6 |
| 6,675,833 B2 | * | 1/2004 | Maldavs | 137/614.03 |
| 2003/0145892 A1 | | 8/2003 | Maldavs | |

* cited by examiner

COUPLING FOR SELF-CONTAINED BREATHING APPARATUS

BACKGROUND OF THE INVENTION

Self-contained breathing apparatuses that are used, for example, by firefighters include a carrying frame strapped to the body with an attached breathing regulator. Breathing hoses extend from the regulator to a mouthpiece which the firefighter carries in his mouth when in use. The breathing air is supplied by a compressed-air tank with a structural volume of approximately 6 liters. To enable the tank to hold a sufficient volume, the air in the tank is compressed to approximately 300 bar.

The connection that supplies breathing-air from the tank to the regulator can be disconnected. In this way, the air tank can be refilled on the emergency vehicle without any potential danger. Once filled, the tank is attached to the carrying frame and re-connected to the regulator so as to allow the flow of air from the tank. This connection of the tank to the regulator should happen relatively quickly in order to avoid any loss of time. In addition, the connection must be easy to make. If complicated handling were required it could present a potential danger.

The compressed-air tank has a separate hand valve so that connecting the compressed-air tank both to the pump and also to the regulator can be performed without pressure. This significantly simplifies the necessary couplings. However, a situation in which inadvertent actuation of the tank valve leads to an impermissible build-up of pressure in parts of the coupling device preferably should be prevented because otherwise a later connection may be impossible. Moreover, a dangerous air flow should not be produced when the tank valve is opened.

Additional issues relating to the connection point include preventing the penetration of foreign matter when the coupling is disconnected and preventing a build-up of pressure caused by an inadvertently opened tank valve.

BRIEF SUMMARY OF THE INVENTION

In view of the foregoing, a general object of the present invention is to provide a coupling arrangement for self-contained breathing apparatuses that addresses at least some of the design issues described above.

The fluid coupling of the invention includes a socket part in which a throttling device is provided that is controlled by the insertion of a plug. When the plug is pulled out, the throttling device exhibits a high flow resistance, but without blocking the flow path through the coupling part. In this way, an undesired pressure build-up in the socket part is prevented if it is connected to the compressed-air tank and the tank valve is inadvertently opened. On the other hand, opening the tank valve does not lead to a dangerous compressed-air discharge, because with a high flow resistance, the throttling device effectively limits the emerging quantity of air even with a pressure of 300 bar in the tank.

When the coupling is connected, i.e., when the plug is inserted into the socket part, the throttling device is substantially inactive and no longer limits the air flow from the compressed-air tank to the regulator. In contrast, if the arrangement is made so that the plug, not the socket part, is connected to the compressed-air tank, the throttling device is located in the plug and is controlled by the socket part.

Another aspect of the invention involves creating a plug and a socket part that are protected against the infiltration of foreign matter.

The socket part can include a base body through which a fluid passage extends. The base body carries a guide sleeve arrangement that is anchored to the base body. The guide sleeve arrangement guides a series of other structural elements of the socket part. The guide sleeve arrangement thus forms a sort of base body of the socket part that has an insertion end with an opening that is set off from the actual base body. The guide sleeve arrangement includes a plunger that is used to push back a filler piece into the inserted plug when the coupling is connected together so that flow through the inserted coupling has the lowest possible flow resistance. The plunger of the socket part is assembled from a neck part and a head that sits thereon. There is a gap between the guide-sleeve arrangement and the head of the plunger that receives an insertion end of the plug when the coupling is connected.

A closing sleeve is provided that mechanically seals the annular gap to a large extent so that this gap cannot collect foreign particles when the plug is removed. However, this further provides air permeability so that no pressure can build up behind the closing sleeve. Such pressure would otherwise block, or at least make more difficult, insertion of the plug. The closing sleeve is biased in the direction of a closed position of the annular gap with the help of a biasing device.

In addition, the socket part has a mechanism that is designed to produce a throttled fluid connection between the passage channel in the base body and the outer atmosphere when the plug is removed. According to one embodiment of the invention, this mechanism can be configured such that an optional coupling sleeve cannot contact the side of the plunger head facing and sealing against the base body. Thus, air can escape from the space within the coupling sleeve to the outer atmosphere and any pressure generated can be dissipated.

According to another aspect of the fluid coupling of the invention, the socket part has a base body on which a guide sleeve arrangement is anchored. A passage channel that communicates with the interior of the guide-sleeve arrangement extends through the base body. A plunger is in the guide-sleeve arrangement there is a plunger. The plunger ends close to the insertion end or the opening of the guide sleeve arrangement. At such point, the plunger has a head that together with the guide sleeve arrangement defines an annular space that continuously connects, directly or indirectly, to the passage channel in the base body.

The guide sleeve arrangement contains openings in which holding elements for an inserted plug are guided. A locking sleeve is provided on the guide-sleeve arrangement. The locking sleeve is movable in an axial and in a peripheral direction between a locked position and a released position. A biasing spring operates between the base body and the locking sleeve in the axial direction and in the peripheral direction. This arrangement allows an axial shift of the locking sleeve for the actual decoupling process. Such an axial movement is relatively easy to accomplish. However, so that such an axial movement is not inadvertently brought about if a firefighter gets the coupling stuck in some place axial movement of the locking sleeve is only possible after it has been brought into a certain rotational position when the plug is inserted. This considerably increases the safety of the coupling.

As will be appreciated by those skilled in the art, the different aspects of the present invention can be combined in various different ways in order to optimize the advantages of the socket part.

The guide sleeve arrangement can be most easily attached to the base body when the base body has a corresponding internal thread. For locking the inserted plug, locking elements can be provided in bores in the guide sleeve arrangement in the vicinity of its insertion end.

In order to accommodate the biasing mechanism, particularly for the closing sleeve, the guide sleeve arrangement preferably includes an inner and an outer guide sleeve that define a corresponding annular gap between them. The inner guide sleeve ends at a base with at least one bore. The bore extends in the longitudinal direction of the inner guide sleeve and is used as a flow channel. The interior of the inner guide sleeve connects to the passage channel via the bore with respect so as to allow a flow therebetween. Therefore, the base of the inner guide sleeve can simultaneously also be used as an attachment point for the plunger. The passage bore opens laterally next to the plunger.

The closing sleeve for closing the gap for the insertion end of the plug preferably includes a cylindrical collar and a flange that projects radially inwards. In combination with another outwardly projecting collar, the closing sleeve can interact with the outer guide sleeve in order to limit the stroke in the direction towards the insertion end. The diameter of the cylindrical collar corresponds to the guide sleeve arrangement such that the cylindrical collar can be inserted into the annular space between the outer and the inner guide sleeve.

To ensure a leak proof coupling between the socket part and the plug without producing significant flow resistance, a coupling sleeve is in the interior of the guide sleeve arrangement. This coupling sleeve is guided in the guide sleeve so as to be movable longitudinally. Movement of the coupling sleeve in the direction towards the insertion end is limited by contact with the plunger. This contact is advantageously not tight so that there is not any pressure decrease in the interior of the socket.

A biasing device can be provided for the moving coupling sleeve in order to bias the coupling sleeve in the direction towards the insertion end or in the direction towards the plunger head.

For actuating the coupling sleeve, a flange is provided on the coupling sleeve which interacts indirectly with the free end of the plug in order to shift the coupling sleeve accordingly as soon as it engages completely with the plug and the sealing element associated with the plug. For locking the plug, a locking sleeve which controls the movement of the locking elements is provided on the socket. The locking sleeve sits on the outside of the guide sleeve arrangement and can move in the axial as well as the peripheral direction. To selectively increase or limit the stroke of the locking elements, the locking sleeve contains a circumferential ring groove.

The base body and/or the guide sleeve arrangement forms a counter bearing for a spring that attaches to the other end of the guide sleeve. In this way, the guide sleeve can be biased in the axial and peripheral directions.

To prevent too large a stroke of the locking sleeve, a grip sleeve connected to the locking sleeve can have corresponding stops that interact with stops on the base body.

So that shifting of the locking sleeve in the direction of releasing the plug is blocked in the normal locked position, a cam surface can be provided on one of the base body or on the locking sleeve which interacts with a follower element in the shape of a peg on the other element. This ensures that shifting of the sleeve in the direction of releasing the plug is possible only after the locking sleeve has been turned back to its starting position (i.e., its position without the plug). The locking sleeve can remain blocked in this position through the interaction of the locking elements with the closing sleeve until the closing sleeve has been pushed back by a plug.

The plug for a socket of a fluid coupling, in particular for self-contained breathing apparatuses, includes a base body with a flow channel. The base body forms a tubular insertion end with an opening on one end. The insertion end is provided to penetrate into the interior of the socket. A closing piece is in the insertion end of the plug. The closing piece closes the opening in the rest position of the plug and can be pushed back by a corresponding element on the socket in order to open the flow path. The closing piece is biased into the closed position in the plug by a biasing device. The closing piece prevents foreign matter from entering into the interior of the plug and its passage channel when the plug has been pulled out. Because the insertion end of the plug is provided with seals for fluid-tight sealing in the socket, if necessary not only a seal against foreign matter but also a pressure-tight seal is produced.

Depending on whether the plug or the socket is arranged on the compressed air tank, it can be advantageous to construct the closing piece of the plug so that it is permeable to gas in order to prevent build-up of pressure on the rear side of the plug or bleed-away of existing pressure.

From the following description of illustrative embodiments of the invention, those skilled in the art will appreciate any number of modification can be made without departing from the invention. For example, some of the control parts can change their position on the interacting part, e.g., the tracing pin and the associated cam.

DETAILED DESCRIPTION OF THE INVENTION

Figure 1:
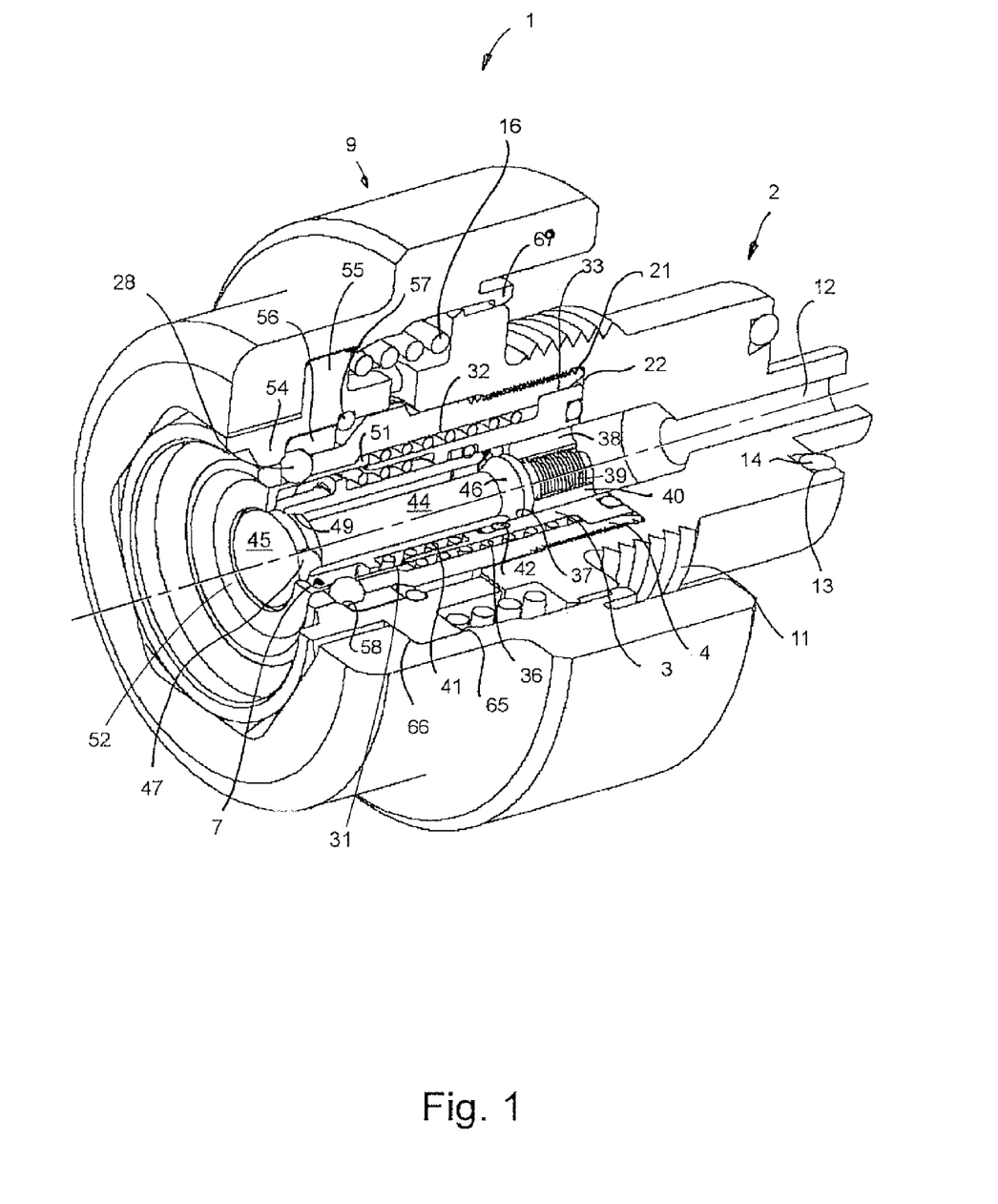
FIG. 1 is a partially cut-away perspective view of an exemplary socket according to the invention.
Figure 2:
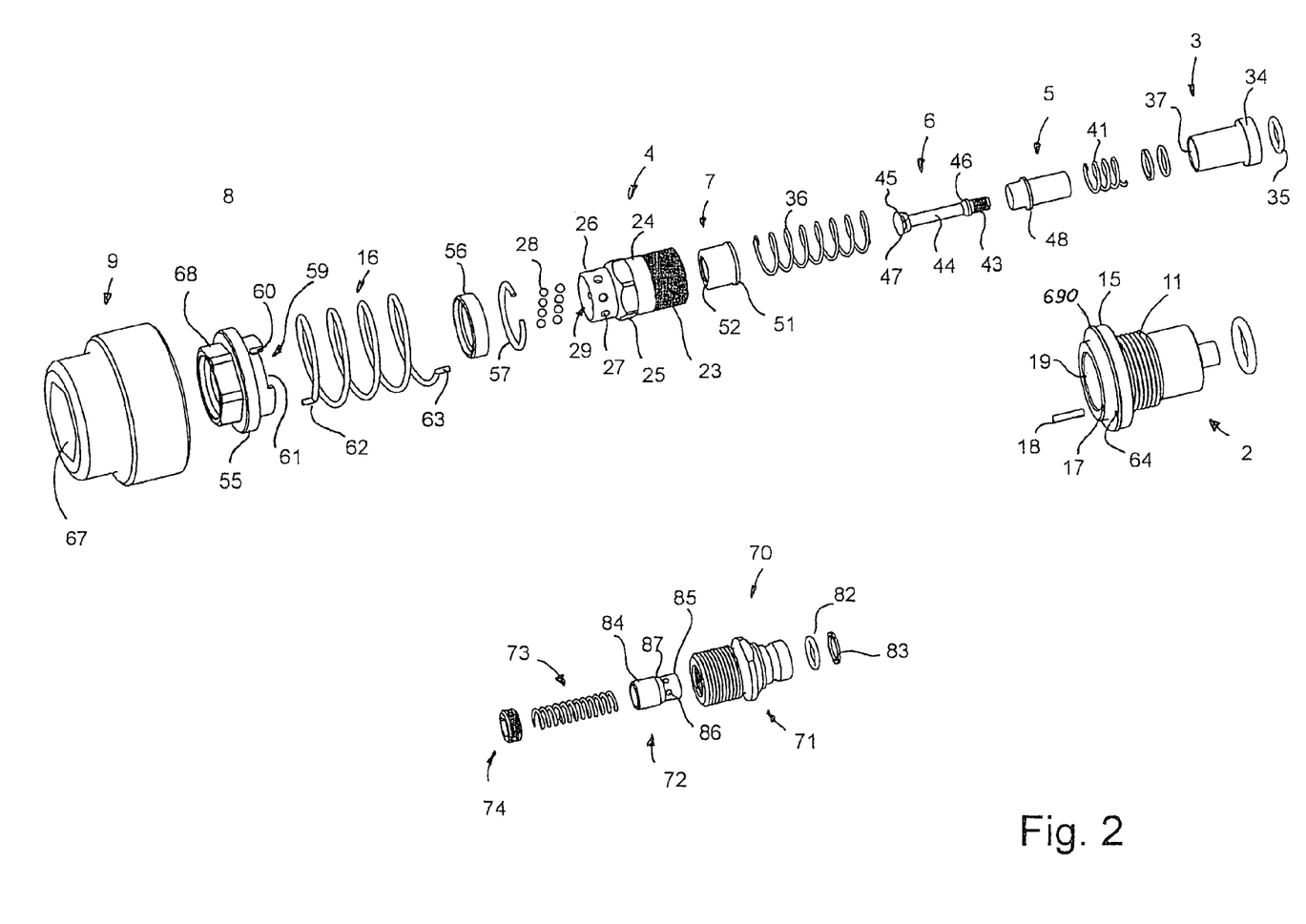
FIG. 2 is an exploded perspective view of the socket of FIG. 1 and a mating plug.

Referring to FIG. 1 of the drawings, an illustrative socket part 1 is shown in a perspective section view. FIG. 2 shows the socket part 1 in an exploded view. The socket part 1 includes a base body 2, a guide sleeve arrangement having an inner guide sleeve 3 and an outer guide sleeve 4, a coupling sleeve 5, a plunger 6, a closing sleeve 7, a locking sleeve 8 and a grip sleeve 9.

The outer guide sleeve 4 is screwed into the base body 2. The outer guide sleeve is also used as a hollow screw for attaching the inner guide sleeve 3 in the base body 2. The coupling sleeve 5 slides in a sealed manner into the inner guide sleeve 3, which also carries the screwed-in plunger 6. When sliding in the axial direction, the closing sleeve 7 is guided in the outer guide sleeve 4. The outer guide sleeve 4 also forms the guide for the locking sleeve 8 on which the grip sleeve 9 is anchored.

The base body 2 is a substantially rotationally symmetric body having an outer thread 11 and a coaxial passage channel, which leads through the body and which is formed by a part of a continuous stepped bore 12. The rear end of the base body 2 contains a ring groove 13 that surrounds the stepped bore 12 and in which an O-ring 14 is located. With the help of the thread 11, the socket part 1 can be attached in a sealed manner to a tank valve of a compressed-air tank. For example, the compressed-air tank can be the compressed-air tank of a self-contained breathing apparatus having a nominal volume of 6 to 10 L and in which air can be stored at a pressure of 300 bar. The tank valve is a standard hand-actuated valve, which is opened or closed when needed.

The base body 2 carries a flange 15 on its outer side in connection with the outer thread 11 which is used as a counter bearing for a helical spring 16 that interacts with the locking sleeve 8. In addition, a bore 17 in which a tracing pin 18 is housed is provided in the base body 2 radially inward of the flange 15. The tracing pin 18 extends in the longitudinal direction of the rotationally symmetric base body 2 towards the locking sleeve 8.

The stepped bore 12 includes an increased diameter section 19 that is formed on the end of the base body 2 facing the insertion end. The increased diameter section 19 transitions in into an internal thread 21 which ends at a straight annular shoulder 22. The outer guide sleeve 4 is screwed into this internal thread 21.

A corresponding external thread 23 is provided on the end of the outer guide sleeve 4 facing the base body 2. The external thread 23 transitions into a cylindrical surface 24 with the same diameter. A hexagonal section 25 with rounded corners connects to the cylindrical section 24. The hexagonal section 25 forms an air-permeable sliding bearing surface for the locking sleeve 8. A circular, tubular projection 26 of the guide sleeve 4 that contains a series of radial bores 27 in which locking balls 28 sit connects to the hexagon 25. The free end of the cylindrical projection 26 forms an opening 29. The cylindrical section 24 is used as a centering surface in the smooth part of the increased diameter section 19 of the stepped bore 12.

The inner shape of the outer guide sleeve 4 is best shown in FIG. 1. In particular, the outer guide sleeve 4 is perforated by a cylindrical stepped bore 31. The section of the stepped bore 31 with the smallest diameter is located in the area of the tubular projection 26 and ends approximately at the height of the hexagon 25. A section 32 with greater diameter begins at that point. The section 32 with greater diameter finally transitions at the rear end into a section 33 with even larger diameter. The even larger diameter section 33 is used as a receiving and holding space for the inner guide sleeve 3.

The rear end of the inner guide sleeve 3 has a radially outwardly extending flange 34 which is configured to lie on the shoulder 22 of the base body 2. To seal the flange 34 against the shoulder 22, the flange 34 contains a circumferential ring groove with an O-ring seal 35 sitting in this groove. The outer surface of the flange 34 extends into the section 33 of the stepped bore 31 and is pressed by its closing shoulder against the shoulder 22.

The portion of the inner guide sleeve 3 forward of the shoulder 34 is cylindrical and smooth. This portion of the inner guide sleeve 3 is long enough that it ends approximately at the end of the bore section 32 adjacent to the insertion end or the opening 29 as shown in FIG. 1. The diameter of this portion of the inner guide sleeve 3 is significantly smaller than the inner diameter of the bore section 32 which produces an annular gap. A compression spring 36 sits in this annular gap between the outer circumferential surface of the inner guide sleeve 3 and the inner circumferential surface of the bore section 32.

A pocket bore 37 is provided in the inner guide sleeve 3, whereby a base 38 remains at the end of the inner guide sleeve 3. The base 38 has a coaxial internal threaded bore 39 extending therethrough and a series of through bores 40 that are arranged laterally next to the threaded bore 37. The plunger 6 is screwed into the threaded bore 39. The pocket bore 37 has an enlarged diameter near the end opposite the flange 34 for receiving a helical compression spring 41. The helical compression spring 41 acts between the inner guide sleeve 3 and the coupling sleeve 5. The pocket bore 37 also contains a circumferential ring groove 42 adjacent the base 38. An O-ring 42 that seals against the coupling sleeve 5 sits in the groove 42.

The plunger 6 includes a threaded shaft 43, a throat part 44 and a head 45. The threaded shaft 43 is screwed tightly into the threaded bore 39 of the inner guide sleeve 3 with a corresponding shoulder 46 defining the screw-in depth. The throat 44 is dimensioned so that a significant annular gap is defined between the coupling sleeve 5 and the throat. The head 45 has a truncated cone shape with the smaller diameter portion facing the threaded shaft 43. At least one portion of the conical surface of the head 45 is flattened by a bevel 47.

In this case, the coupling sleeve 5 comprises a tube which is cylindrical and smooth on the inside and on the outside except for where a flange 48 is arranged on the outside of the coupling sleeve. The inner diameter of the coupling sleeve 5 is slightly greater than the outer diameter of the shoulder 46 of the plunger 6 so that the plunger can be inserted into the coupling sleeve 5 from the front.

The outer diameter of the coupling sleeve 5 corresponds to the open width of the stepped bore 37 at each position where the ring groove 42 with O-ring is located. The end of the coupling sleeve 5 adjacent to the opening 29 has a bevel surface 49 that can contact the conical surface of the head 45 of the plunger 6. When it contacts the outer surface of the conical head 45, the bevel surface 49 defines a throttling position together with the flattened section 47.

In the assembled state, the free end of the head 45 (as shown in FIG. 1) springs back slightly relative to the opening 29 of the outer guide sleeve 4. The spring 41 sits in the space between the flange 48 and the offset in the inner guide sleeve 3. The spring 41 biases the coupling sleeve 5 in the direction towards contact with the head 45.

The closing sleeve 7 is a substantially cylindrical, thin-walled tube that carries a radially outwardly extending flange 51 on its rear or inner end. The closing sleeve 7 also carries a radially inwardly extending flange 52 on its front end adjacent to the opening 29. The radially outwardly extending flange 51 extends into the bore section 32 of the outer guide sleeve 4 and thus into the annular gap which is formed between the bore section 32 and the outer circumferential surface of the inner guide sleeve 3. The compression spring 36, which is supported on the flange 34 of the inner guide sleeve 3, lies against the flange 51. The interior of the closing sleeve 7, which has a cylindrical configuration between the flange 52 and the flange 51, has a size that corresponds to the outer diameter of the outer circumferential surface of the inner guide sleeve 3. In contrast, the outer diameter is equal to the size of the open interior of the tubular projection 26 of the outer guide sleeve 4.

The radial thickness of the front flange 52 is selected such that in the position shown in FIG. 1 the flange 52 fills up the annular gap between the head 45 at its largest point and the opening 29 of the outer guide sleeve 4 with a very small clearance of 0.1 mm or less. Movement of the closing sleeve 7 in the direction towards the opening 29 is limited by contact of the flange 51 on the affected shoulder of the stepped bore 31, namely where the section 32 transitions into the bore section within the projection 26.

The closing sleeve 7 also functions as a control component for the locking balls 28. The locking sleeve 8 slides in the assembled state on one side on the projection 26 of the outer guide sleeve 4 and on the other side on the hexagon 25 of the outer guide sleeve. The locking sleeve 8 includes a flange 54 that projects radially inward and a flange 55 that extends radially outward. The spring 16 contacts this flange 55. A ring 56 sits in the locking sleeve 8. The ring 56 is held by a securing ring 57 against the rear side of the flange 54. The ring 56 limits a circumferential ring groove 58 for the locking balls 28 together with the flange 54.

The locking sleeve 8 has a groove 58 on the side facing the base body 2. The cam track 58 is assembled from a recessed section 60 having a greater axial depth but a smaller extent in the circumferential direction and also a recess 61 having a smaller axial depth but a greater extent in the circumferential direction. This cam track 59 is traced by the tracing pin 18.

So that the biasing spring 16 can prestress the locking sleeve 8 not only in the axial direction but also in the circumferential direction, the spring 16 has two angled spring ends 62 and 63. The spring end 62 extends into an axial bore of the flange 55, while the spring end 63 is anchored in the bore 64 so as to be offset laterally and parallel to the axis in the flange 15 of the base body 2.

The grip sleeve 9 sits on the locking sleeve 8. The grip sleeve engages behind the flange 55 with a catch rib 65 and contacts the flange 55 on the opposite side with a shoulder 66. The grip sleeve 9 has a hexagonal opening 67 which extends onto the corresponding hexagonal projection 68 of the locking sleeve 8 so as to lock the grip sleeve in rotation relative to the locking sleeve 8. Another locking rib 69 is engageable behind a rib 690 on the outer circumferential surface of the flange 15 of the base body 2. In the position shown in FIG. 1, the rib 69 is spaced a distance from the rib 690 so that the grip sleeve 9 can move forwards (i.e., to the left relative to the drawings) a distance approximately equal to the axial length of the ring 56.

Figure 3:
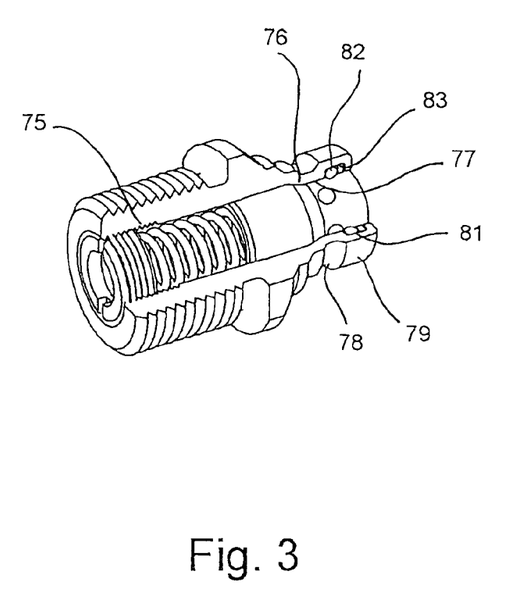
FIG. 3 is partially cut-away perspective view of the plug for the socket of FIG. 1.

A plug 70 that is engageable with the socket part 1 is shown in FIGS. 2 and 3. The plug 70 includes a plug base body 71, a closing piece 72, a biasing spring 73 and also a spring counter bearing 74. A stepped bore, which contains an internal thread 75 at the rear end of the plug 70, extends through the plug base body 71. At a distance from the internal thread 75, the through-bore transitions into a conical surface 76 and then into a cylindrical bore section 77 having a smaller diameter. The plug base body 71 contains a circumferential ring groove 78 on its outer circumferential surface at the point where the conical surface is arranged. A cylindrical projection 79 of the plug 70 extends is connected to this ring groove 78. A groove 80 with an O-ring seal 82 and a support ring 83 is provided on the inside of the plug base body 71 in the area of the cylindrical projection 79.

The closing piece 72 has a bowl shape with a tubular, cylindrical collar 84 and a cylindrical head 85. A series of radial bores 86 are provided where the collar 84 transitions into the head 85. As shown in FIG. 3, the head 85 has a diameter that enables the outer circumferential surface of the head to contact the O-ring seal 82 in a sealing manner. In this position, the radial bores 86 are always located to the left (relative to FIG. 3) of the O-ring 82. Movement of the closing piece 72 is limited by the conical surface 76. A corresponding conical surface 87 on the closing piece 72 is complementary to the conical surface 76. If the two conical surfaces 76 and 87 contact each other, then the flat end of the head 85 is flush with the free end of the insertion projection 79.

The compression spring 73 is positioned between the closing piece 72 and the counter bearing screw 74, i.e., the spring 73 extends into the pocket bore, which is surrounded by the collar 84. The counter bearing sealing screw 74 is either drilled, if the bore is free, or it contains a screen produced in the bore from a sintered metal.

Figure 4:
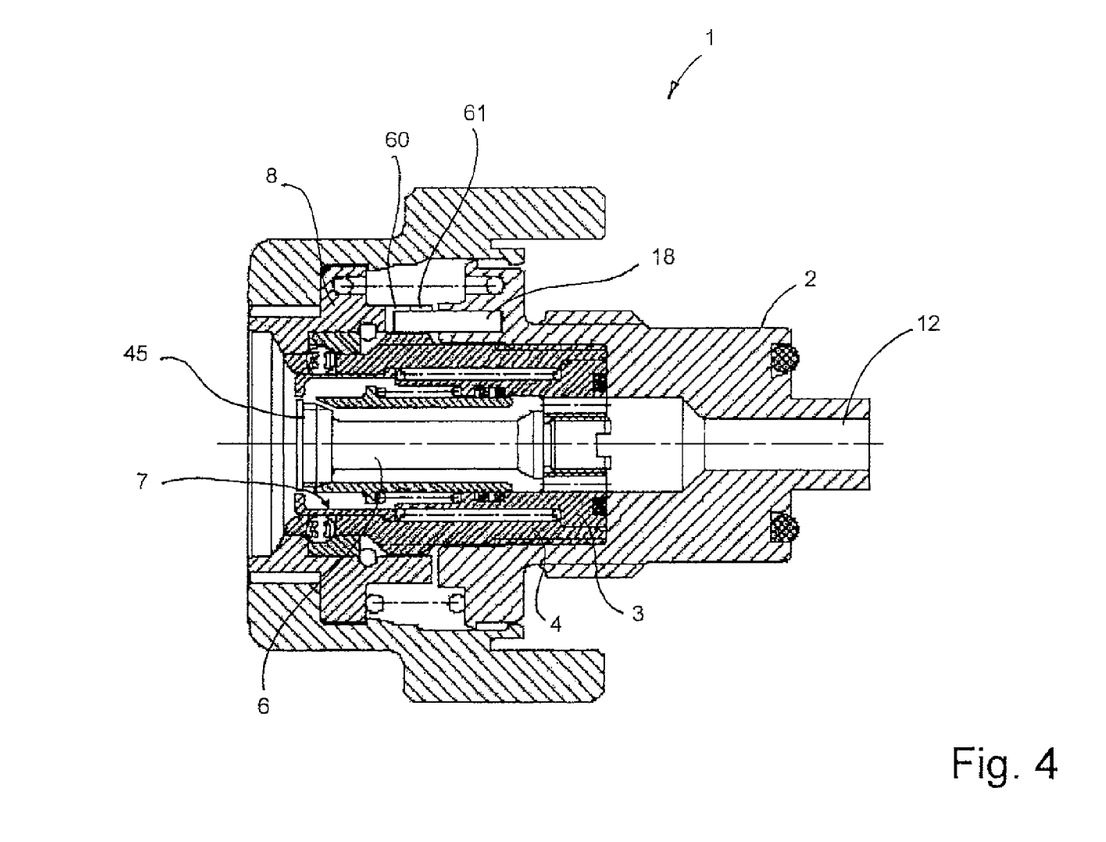
FIG. 4 is a side sectional view of the socket of FIG. 1 with the plug not inserted.
Figure 5:
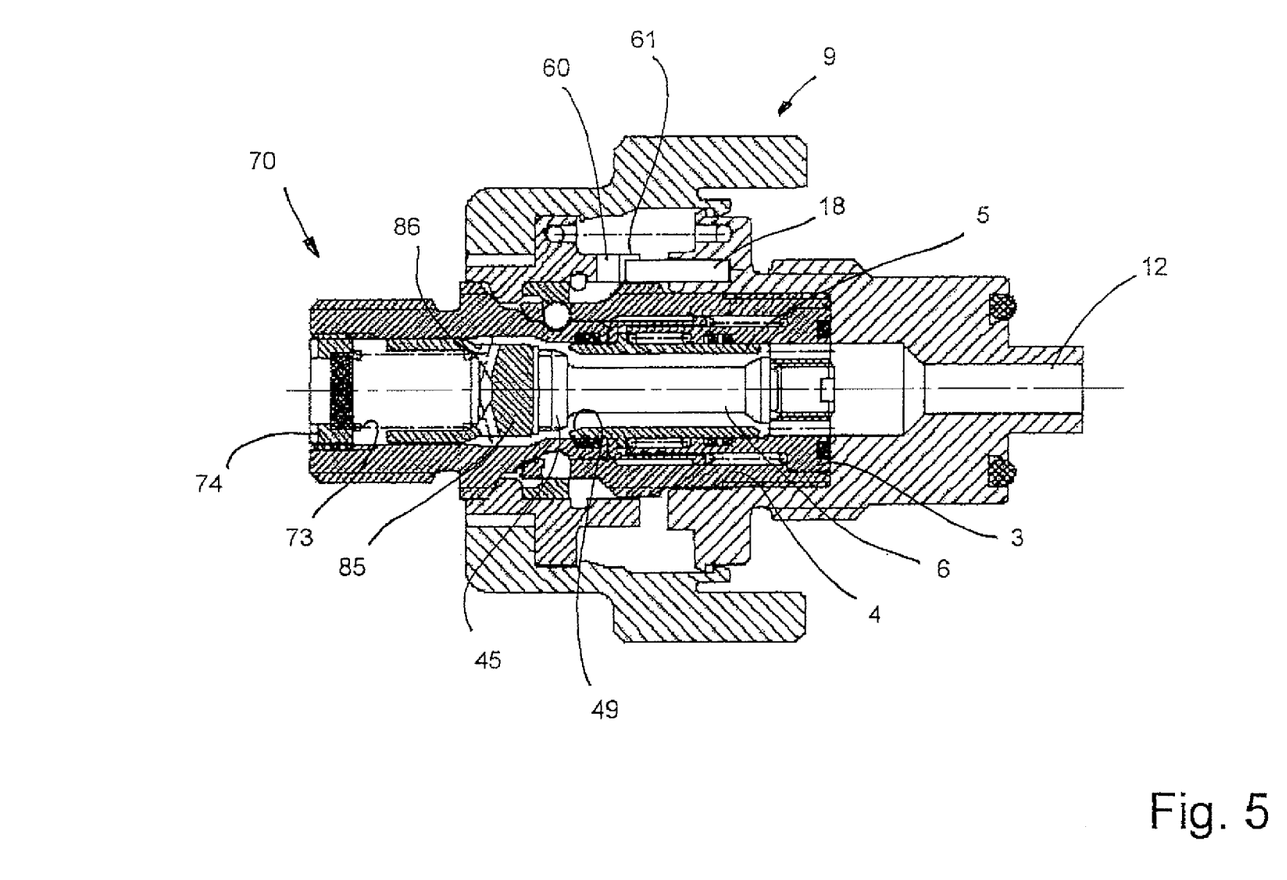
FIG. 5 is a side sectional view of the plug of FIG. 3 engaged in the socket of FIG. 1.

The operation and interaction of the socket part 1 and the plug 70 is shown in FIGS. 4 and 5. When the plug is not inserted into the socket part 1, the closing piece 72 is in the position shown in FIG. 3. In such position, the head 85 extends into the O-ring seal 82 and completely seals the plug. Foreign particles cannot penetrate. Any flow through the plug is also disrupted. The position of the socket part 1 without an inserted plug is shown in FIG. 4. In this position, the locking sleeve 8 is located in the rear position with the groove 58 in the position to partially hold the locking balls 28. The closing sleeve 7 is in its front position and seals, to a large extent, the annular gap between the head 45 and the opening 29 in the outer closing sleeve 4. The seal is not an airtight closure, but instead substantially prevents the penetration of particles above a given size. An annular gap between the flange 52 and the head of approximately 0.1 mm remains. The outer surface of the closing sleeve 7 contacts the inner circumferential surface of the outer guide sleeve 4 in a sliding manner. Thus, in this position, the locking balls 28 can also be held in their radially outer position by the closing sleeve 7 as shown in FIG. 4. The interaction between the closing sleeve 7 and the locking balls 28 holds the locking sleeve 8 in the illustrated position because the balls extend into the catch groove 58. The spring 36 applies the force that moves the closing sleeve 7 into this position.

The spring 41 pushes the coupling sleeve 5 into the contact position on the head 45. Thus, through the interaction of the coupling sleeve 5 with the head 45, the flow channel is largely throttled by the coupling part 1. If a compressed-air tank is connected to the socket part 1 and the tank valve is opened by hand, the emerging compressed air can flow through the passage channel 12 and the bores 40 into the annular gap between the throat 44 of the plunger 6 and the coupling sleeve 5. Because the conical surface 49 of the coupling sleeve 5 contacts the head 45 of the plunger it forms a seal at the head 45. Flow of compressed air is only permitted at the flattened position 47. After the tank valve is closed, the pressure can be gradually equalized via leakage through the passage defined by the flat point 47. Due to the throttling effect at this position, a dangerous air stream cannot be discharged from the socket part 1.

In the non-coupled position, the recess 60 of the cam track 59 aligns with the inserted tracing pin 18. Thus, twisting of the locking sleeve 8 in the circumferential direction is blocked. If the plug 70 is inserted starting from the position shown in FIG. 4, the insertion end 79 of the plug enters into the annular gap between the head 45 and the insertion end 26 of the outer guide sleeve 4. The closing sleeve 7 presses back against the effect of the spring 36. The O-ring seal 82 of the plug 70 fits the head 45 of the plunger 6 and is led to the coupling sleeve 5 where the O-ring forms a sealing contact. Further pushing of the plug, also moves the coupling sleeve 5 back against the effect of the spring 41 and a wide-open conical annular gap is formed between the coupling sleeve 5 and the head 45. In the end position, the retaining groove 78 is opposite the locking balls 28. Therefore, any blocking effect produced by the locking balls 28 is cancelled by the locking sleeve 8. The locking sleeve 8 can be moved by the spring 16 forward toward the plug 70 and the cylindrical surface of the ring 56 is brought over the locking balls 28. The locking balls are thus effectively prevented from moving radially outwards. Instead, the locking balls are held in the groove 78.

Due to the axial movement of the locking sleeve 8, the tracing pin 18 is freed from the recess 60. The biasing spring 16 can then rotate the locking sleeve 8 in the circumferential direction until the tracing pin 18 comes to the end of the recess 61. This corresponds to approximately 30° of rotational movement.

When the plug 70 is inserted, the head 45 of the plunger 6 also comes in contact with the closing piece 72 and pushes the closing piece 72 against the effect of the spring 73 back into the plug. Therefore, the sealing connection between the conical surface 76 and the conical surface 87 is canceled, so that air can flow substantially freely through the plug 70. Thus, when the plug is inserted in the socket air freely communicates between a compressed-air tank connected to the coupling part 1 and a regulator connected to the plug 70. A closed tank valve can be turned without any potential danger in order to deliver compressed air to the regulator.

Before disconnecting the coupling connection, the tank valve is first closed. A corresponding release of pressure can occur via the regulator as the plug connection can now be separated without practically any applied pressure. The position of the tracing pin 18 in the area of the recess 61 prevents the locking sleeve 8 from being pulled back over the grip sleeve 9. To allow the locking sleeve 8 to be pulled back, the locking sleeve must first be turned against the effect of the helical spring 16 until the tracing pin 18 aligns with the deeper recess 60. Then the locking sleeve 8 can be pulled back into a position in which its catch groove 58 aligns with the ring from the balls 28. The balls 28 can be forced radially outwards from the ball groove 78 by the plug, so that the plug 70 can be pushed out of the socket part 1 by the effect of the springs 36 and 73. If the plug is pulled out, the closing sleeve 7 moves back to the area of the locking balls 28 and holds the locking balls in the catch groove 58 of the locking sleeve 8.

If the compressed-air tank with the hand-actuated tank valve is not connected to the socket part 1, but instead to the plug 70, then the plug 70 is provided with a controllable throttling device that does not obstruct flow between the tank and the regulator in one position, namely the inserted position. The throttling device however greatly throttles flow to the outer atmosphere in the other position in order to prevent a dangerous outflow of air without completely blocking the flow through the plug 70.

Both the plug 70 and socket part 1 are largely protected from the penetration of foreign matter. In particular, both the socket part 1 and plug 70 form essentially smooth, flat, insertion ends with minimal cracks or joints and thus are easy to keep clean.

A socket part of a fluid coupling that can be actuated without pressure is provided with a mechanism for mechanically sealing to a large extent the insertion space of a plug against the penetration of foreign matter. In addition, a throttling device is provided that does not obstruct the fluid connection when the plug is inserted, but produces a high flow resistance with the plug removed without completely blocking flow. The associated plug also has a sealing device to protect the flow channel against the penetration of particles when the plug has been pulled out. In the case of the connection of the plug to a compressed-air tank, the plug has a throttling device that does not obstruct flow when the plug is inserted, but provides considerable flow resistance when the plug has been pulled out without completely blocking the flow.

The invention claimed is:

1. A socket for receiving a plug of a fluid coupling comprising:
    a base body having a passage channel therein;
    a guide-sleeve arrangement anchored in the base body and arranged in an extension of the passage channel, the guide-sleeve arrangement having an insertion end that is set apart from the base body;
    a plunger located in the guide sleeve arrangement and extending up to adjacent the insertion end of the guide sleeve arrangement, the plunger carrying a head adjacent the insertion end of the guide sleeve arrangement, the plunger and the guide sleeve arrangement defining an annular space in fluid communication with the passage channel;
    a closing sleeve arranged in the annular space between the guide sleeve arrangement and the plunger, the closing sleeve being longitudinally movable between a work position and a rest position, wherein in the rest position the closing sleeve largely closes a portion of the annular space between the guide-sleeve arrangement and the head of the plunger without sealing the annular space;
    a biasing element for biasing the closing sleeve into the rest position;
    a locking device for a plug inserted into the socket; and
    a throttling device that enables the passage channel to vent to an outer atmosphere when the plug has been removed from the socket, wherein the throttling device comprises a bevel on the plunger head which provides a gap on a portion of the interface between a coupling sleeve and the plunger.

2. The socket according to claim 1, wherein the base body is substantially rotationally symmetric and carries a connection thread.

3. The socket according to claim 1, wherein the passage channel of the base body comprises a stepped bore.

4. The socket according to claim 1, wherein the base body has an internal thread for attaching the guide sleeve arrangement.

5. The socket according to claim 1, wherein the guide sleeve arrangement is screwed to the base body.

6. The socket according to claim 1, wherein a plurality of bores are provided in adjacent the insertion end of the guide sleeve arrangement and the locking device including a plurality of locking elements that sit in the plurality of bores in the guide sleeve arrangement.

7. The socket according to claim 1, wherein the guide sleeve arrangement includes an outer and an inner guide sleeve which together define a cylindrical annular gap that receives a helical compression spring.

8. The socket according to claim 7, wherein the plunger is arranged in the inner guide sleeve.

9. The socket according to claim 7, wherein the inner guide sleeve ends at a base having a bore that extends in a longitudinal direction of the inner guide sleeve so as to define a flow channel providing fluid communication between the interior of the inner guide sleeve and the passage channel.

10. The socket according to claim 9, wherein the bore opens in a lateral direction adjacent the plunger.

11. The socket according to claim 7, wherein the closing sleeve comprises a inward projecting flange and a radially outward projecting collar.

12. The socket according to claim 11, wherein the radially outward projecting collar is configured to be insertable in the annular gap between the outer and the inner guide sleeve.

13. The socket according to claim 11, further including the coupling sleeve as being shiftable in the guide-sleeve arrangement in a longitudinal direction parallel to the axis of the plunger.

14. The socket according to claim 13, wherein one end of the coupling sleeve is received in a sealed manner in a bore of the guide sleeve arrangement with the coupling sleeve being movable relative to the guide-sleeve arrangement.

15. The socket according to claim 13, wherein an outer end of the coupling sleeve adjacent the coupling sleeve contacts the head of the plunger.

16. The socket according to claim 13, further including a biasing element for biasing the coupling sleeve in a direction towards the head of the plunger.

17. The socket according to claim 13, wherein the coupling sleeve has a radially outward projecting stop that is engageable with the closing sleeve such that the coupling sleeve is also moved away from the head when the closing sleeve is moved back by an inserted plug (70).

18. The socket according to claim 1, further including a locking sleeve.

19. The socket according to claim 18, wherein the locking sleeve is guided on an outside surface of the guide sleeve arrangement.

20. The socket according to claim 19, wherein the locking sleeve has a circumferential ring groove for receiving locking balls that are guided radially in the guide sleeve arrangement.

21. The socket according to claim 18, wherein the base body or the locking sleeve arrangement has a counter bearing surface for engaging a first end of a spring with the second end of the spring being attached to the locking sleeve.

22. The socket according to claim 18, wherein the locking sleeve is surrounded by a grip sleeve.

23. The socket according to claim 22, wherein the grip sleeve limits the axial stroke of the locking sleeve in at least one direction.

24. The socket according to claim 21, wherein the spring is a helical spring that is active in an axial direction and in a circumferential direction.

25. A socket for receiving a plug of a fluid coupling comprising:
   a base body having a passage channel therein;
   a guide sleeve arrangement anchored in the base body and arranged in the extension of the passage channel, the guide sleeve arrangement having an insertion end set apart from the base body;
   a plunger arranged in the guide-sleeve arrangement and extending up to adjacent the insertion end of the guide sleeve arrangement, the plunger carrying a head adjacent the insertion end of the guide sleeve arrangement, the plunger and the guide-sleeve arrangement defining an annular space in fluid communication with the passage channel; and
   holding elements which are guided into openings in the guide-sleeve arrangement;
   a locking sleeve movable in a longitudinal and a circumferential direction between a locked position and a released position;
   a biasing spring for biasing the locking sleeve in the locked position and in a rotated position,
   a throttling device that enables the passage channel to vent to an outer atmosphere when the plug has been removed from the socket, wherein the throttling device comprises a bevel on the plunger head which provides a gap on a portion of the interface between a coupling sleeve and the plunger.

26. The socket according to claim 25, wherein the base body is substantially rotationally symmetric and carries a connection thread.

27. The socket according to claim 25, wherein the passage channel of the base body comprises a stepped bore.

28. The socket according to claim 25, wherein the base body has an internal thread for attaching the guide sleeve arrangement.

29. The socket according to claim 25, wherein the guide sleeve arrangement is screwed to the base body.

30. The socket according to claim 25, wherein a plurality of bores are provided in adjacent the insertion end of the guide sleeve arrangement and the locking device including a plurality of locking elements that sit in the plurality of bores in the guide sleeve arrangement.

31. The socket according to claim 25, wherein the guide sleeve arrangement includes an outer and an inner guide sleeve which together define a cylindrical annular gap that receives a helical compression spring.

32. The socket according to claim 31, wherein the plunger is arranged in the inner guide sleeve.

33. The socket according to claim 31, wherein the inner guide sleeve ends at a base having a bore that extends in a longitudinal direction of the inner guide sleeve so as to define a flow channel providing fluid communication between the interior of the inner guide sleeve and the passage channel.

34. The socket according to claim 33, wherein the bore opens in a lateral direction adjacent the plunger.

35. The socket according to claim 25, further including the coupling sleeve as being shiftable in the guide-sleeve arrangement in a longitudinal direction parallel to the axis of the plunger.

36. The socket according to claim 35, wherein one end of the coupling sleeve is received in a sealed manner in a bore of the guide sleeve arrangement with the coupling sleeve being movable relative to the guide-sleeve arrangement.

37. The socket according to claim 35, wherein an outer end of the coupling sleeve adjacent the coupling sleeve contacts the head of the plunger.

38. The socket according to claim 35, further including a biasing element for biasing the coupling sleeve in a direction towards the head of the plunger.

39. The socket according to claim 35, wherein the coupling sleeve has a radially outward projecting stop that is engageable with the closing sleeve such that the coupling sleeve is also moved away from the head when the closing sleeve is moved back by an inserted plug (70).

40. The socket according to claim 25, further including a locking sleeve.

41. The socket according to claim 40, wherein the locking sleeve is guided on an outside surface of the guide sleeve arrangement.

42. The socket according to claim 41, wherein the locking sleeve has a circumferential ring groove for receiving locking balls that are guided radially in the guide sleeve arrangement.

43. The socket according to claim 40, wherein the base body or the locking sleeve arrangement has a counter bearing surface for engaging a first end of a spring with the second end of the spring being attached to the locking sleeve.

44. The socket according to claim 40, wherein the locking sleeve is surrounded by a grip sleeve.

45. The socket according to claim 44, wherein the grip sleeve limits the axial stroke of the locking sleeve in at least one direction.

46. The socket according to claim 43, wherein the spring is a helical spring that is active in an axial direction and in a circumferential direction.

* * * * *